United States Patent [19]

Ruppman et al.

[11] Patent Number: 4,715,920

[45] Date of Patent: Dec. 29, 1987

[54] APPARATUS AND METHOD FOR RECYCLING PLASTIC BEVERAGE CONTAINERS

[75] Inventors: Kurt H. Ruppman, Dallas; Charles A. Prano, Richardson, both of Tex.

[73] Assignee: Plastic Recycling Inc., Tex.

[21] Appl. No.: 364,636

[22] Filed: Apr. 2, 1982

Related U.S. Application Data

[63] Continuation of Ser. No. 161,883, Jun. 23, 1980, abandoned.

[51] Int. Cl.[4] .............................................. B32B 31/18
[52] U.S. Cl. ..................................... 156/344; 15/21 D; 15/59; 15/60; 83/155.1; 134/104; 156/154; 156/250; 156/510; 156/584; 264/37
[58] Field of Search .................... 15/21 D, 59, 60, 61; 53/381 A; 83/15, 23, 37, 54, 155, 155.1; 134/72, 73, 104; 156/154, 344, 499, 510, 584, 250; 215/1 C, 12 R, 295, 302, 303, 304, DIG. 6; 264/37

[56] References Cited

U.S. PATENT DOCUMENTS

| | | | |
|---|---|---|---|
| 694,371 | 3/1902 | Goetz | 15/61 X |
| 3,079,936 | 3/1963 | Hockett et al. | 15/61 X |
| 3,534,428 | 10/1970 | Pugh et al. | 15/60 X |
| 3,807,134 | 4/1974 | Zalkin | 53/381 A |
| 3,927,782 | 12/1975 | Edwards | 215/12 R X |
| 4,033,804 | 7/1977 | Baldyga | 156/344 X |
| 4,308,086 | 12/1981 | Valyi | 156/294 X |

OTHER PUBLICATIONS

"Recycling Polyester Bottles," The Goodyear Tire & Rubber Company brochure.

Primary Examiner—Robert A. Dawson
Attorney, Agent, or Firm—Charles E. Brown

[57] ABSTRACT

A system (20) for separating the labels, base cups and caps from plastic bottles for subsequent recycling includes an endless belt (26) mounted for movement around a course. The bottles are attached to the endless belt (26) by means of carriers (32) for advancement between heaters (56, 80) to soften the adhesive securing the labels and base cups. The base cups are removed with a first pair of rotating brushes (68) while the labels are removed with a second pair of rotating brushes (86). The caps are removed with a rotating blade (96). In a second embodiment (110), the bottles are heated by immersion in a tank (112) of hot liquid (114).

44 Claims, 10 Drawing Figures

APPARATUS AND METHOD FOR RECYCLING PLASTIC BEVERAGE CONTAINERS

This is a continuation of application Ser. No. 161,883 filed June 23, 1980 and now abandoned.

TECHNICAL FIELD

The present invention relates generally to a technique for recycling used or rejected plastic containers. More particularly, this invention involves a method and apparatus for separating plastic bottle containers like those used in the soft drink bottling industry into their discrete components for subsequent recycling.

BACKGROUND ART

Increased utilization is being made of thermoplastic materials in the container industry. For example, several brands of soft drinks are now available in two liter plastic containers. Such containers typically comprise a clear or tinted tubular bottle of polyethylene terephthalate (PET) material, a paper label and a metal cap. The paper label is usually attached to the bottle with a hot melt adhesive, such as ethylene vinyl acetate (EVA) material, and may include a polypropylene coating. The metal cap is typically formed of aluminum. Some containers also include a cup of polyethylene attached to the base of the bottle with hot melt adhesive, while the bottoms of the bottles of other containers are formed in order to be free standing.

Substantial quantities of such containers are produced for consumption, after which it has been common practice to incinerate the user containers or utilize them as land fill. When considering the production scale of the bottling industry, it will also be appreciated that considerable quantities of such contianers are also rejected and discarded during the manufacturing process before filling, distribution and usage. A great deal of useful material is thus being discarded because the technology to recycle it has been either unavailable or uneconomical.

More recently, however, there has been growing interest in recycling plastic beverage containers especially in view of the increasing cost and unavailability of petroleum-based materials along with the expanding applications being developed for PET material in particular. In addition, since several states either have adopted or are considering adoption of legislation requiring deposits on all beverage containers, it is expected that even more plastic containers will be readily available for recycling.

The Goodyear Tire and Rubber Company, for example, has developed a system for processing plastic containers into a usable form of PET. After collection, the used or rejected plastic bottles are first densified by compaction or grinding to reduce their bulk. The densified material is then transported to a recycle facility for separation into its discrete components. The paper particles, which are lightest, are first separated by fluidization in an air separator, after which the heavy fraction is gravity fed into an eddy-current separator for removal of aluminum and other nonferrous metals. The process stream, which at this point comprises mainly PET and polyethylne with traces of miscellaneous materials, in then conveyed into hydraulic separators for removal of materials having specific gravities different from PET. After hydraulic separation, the remaining traces of paper and adhesives are removed from the PET in washers before the recycled PET product is dried. The Goodyear system, however, in unduly complex and expensive, and suffers from the disadvantage of low production capacity.

There is thus a need for a new and improved system for separating plastic bottles into their discrete components for recycling.

SUMMARY OF INVENTION

The present invention is directed to a recycling apparatus and method which overcomes the foregoing and other difficulties associated with the prior art. In accordance with the invention, the containers are mounted on carriers secured to an endless belt mounted for movement around a course. The containers are heated during conveyance to soften the adhesive securing the base cup and label to each bottle. In the preferred embodiment, sets of infrared heaters are mounted along the course defined by the endless chain. A first pair of rotating brushes is provided along the course after the heaters for engagement with the base cups of the containers to disconnect them from the bottles and deposit them intact onto a conveyor extending to a first receptacle. A second pair of rotating brushes is positioned beyond the heaters for engagement with the labels of the containers to disconnect them from the bottles and deposit them substantially intact onto a conveyor extending to a second receptacle. A wire mesh conveyor preferably extends underneath the course between the heaters to catch any base cups or labels that might separate from the bottles prematurely. A rotating saw blade is located along the course to split the metal caps on the containers so that they fall into an underlying third receptacle. A fourth receptacle is positioned at the end of the course to receive the clean bottles. The base cup, label, cap and bottle comprising each container are thus collected separately in this manner for subsequent grinding and recycling.

In the second embodiment, a tank of hot liquid is positioned beneath the endless belt so that the adhesive securing the base cups and labels to the bottles is melted as the containers are conveyed through the liquid.

BRIEF DESCRIPTION OF DRAWINGS

A more complete understanding of the invention can be had by reference to the following Detailed Description in view of the accompanying Drawings, wherein.

DETAILED DESCRIPTION

Figures 1, 2:
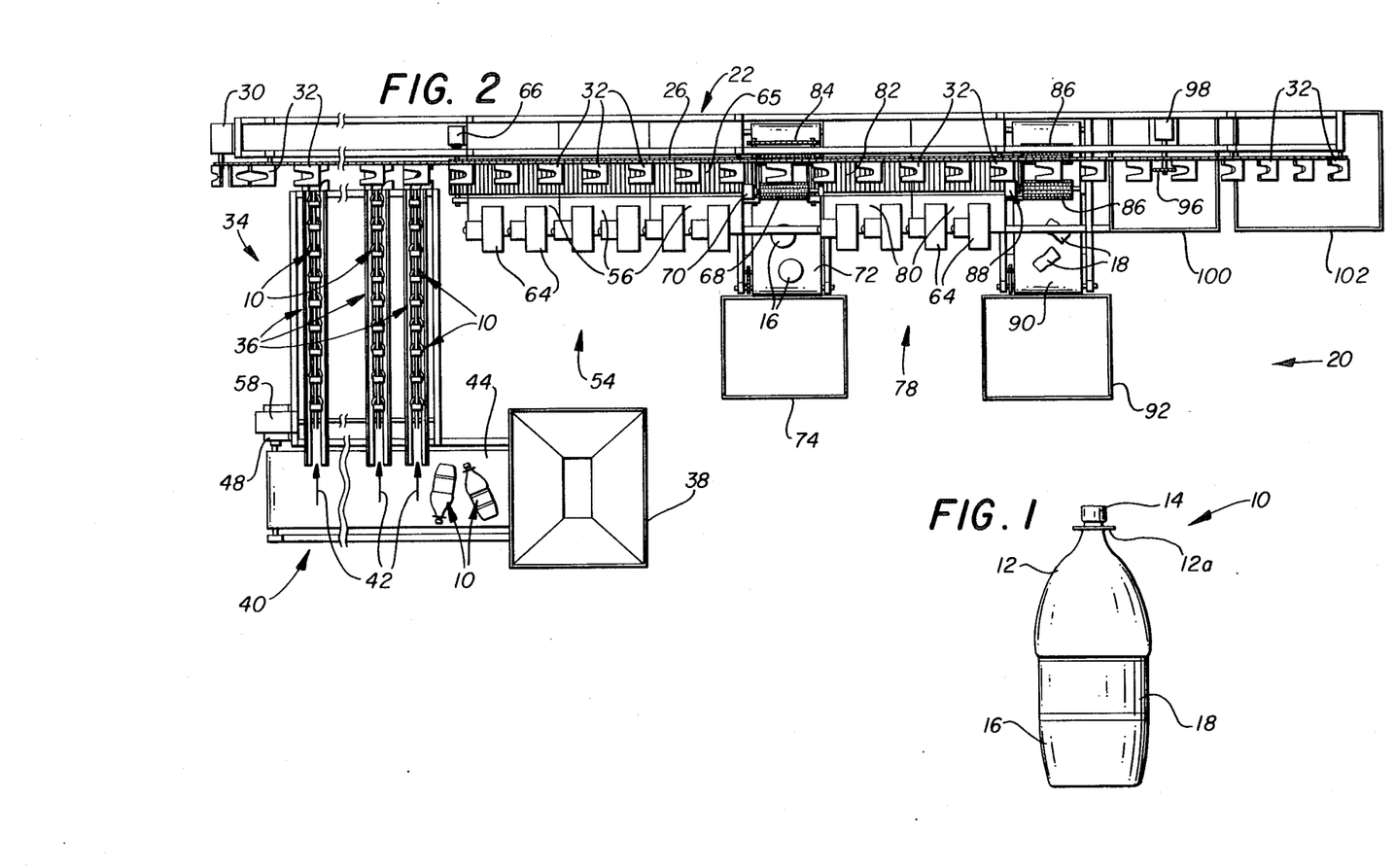
FIG. 1 is an illustration of a container of the type which can be used with the invention.
FIG. 2 is a top view of a recycling apparatus incorporating a first embodiment of the invention.

Referring now to the Drawings, wherein like reference numerals designate like or corresponding parts throughout the views, FIG. 1 shows a container 10 of the type which the present invention is particularly adapted to separate into its component parts for recycling. Bottle 12 is typically formed of polyethylene terephthalate (PET) material, while base cup 16 is usually of polyethylene. Label 18, which is primarily paper with an optional coating of polypropylene, is secured to bottle 12 with a hot melt adhesive, such as ethylene vinyl acetate (EVA), as is base cup 16. Cap 14 is usually of aluminum with an EVA liner. Bottle 12 includes an integral collar 12a by which the container 10 is supported during removal of base cup 16, label 18 and cap 14 therefrom, as will be explained more fully hereinafter.

The present invention is directed to a system for separating plastic containers like container 10 into their discrete components for recycling. The bottom of the bottles 12 of some containers 10 may be preformed so that the container will stand freely without base cup 16. It will be understood that the present invention can be used for breaking down containers 10 with or without base cups 16 thereon.

Figure 3:
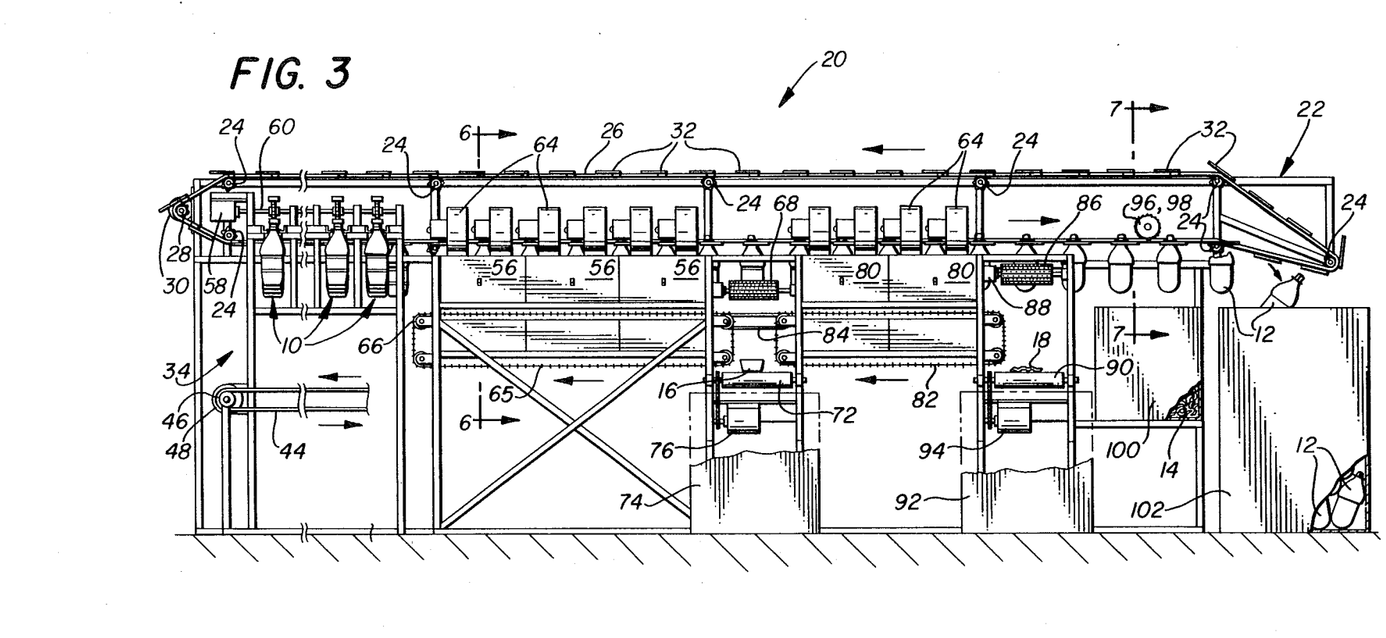
FIG. 3 is a side view of the apparatus in FIGURE 2.

Referring now to FIGS. 2 and 3, there is shown a recycling apparatus 20 incorporating a first embodiment of the invention. Apparatus 20 includes a frame 22 on which are mounted a plurality of sprockets 24, as is best seen in FIG. 3. Sprockets 24 define a course about which chain 26 is constrained for rotation. A drive sprocket 28 and motor 30 are provided at one end of frame 22 for driving main chain 26 around the course.

A plurality of carriers 32 are mounted on chain 26 in serial fashion for movement therewith. Each carrier 32 comprises a substantially flat plate having a diverging notch therein for receiving the neck of bottle 12 beneath collar 12a. Containers 10 are thus conveyed through apparatus 10 on carriers 32 secured to chain 26.

A loading station 34 is preferably provided at the input end of apparatus 20 to facilitate loading of containers 10 onto carriers 32. Loading station 34 comprises one or more magazines 36 each carrying a plurality of containers 10. Used containers 10 to be recycled are dumped into a bin 38 beneath which an endless belt or conveyor 40 is provided. As the containers 10 fall onto conveyor 40 they are transported across the front of the input ends of magazine 36 so that operators (not shown) can manually place them into the magazines as indicated by arrows 42. For clarity, bin 38 and a portion of conveyor 40 have been broken away from FIG. 3. Containers 10 loaded into magazines 36 are thus guided into individual engagement with carriers 32 for conveyance through the work stations of apparatus 20.

Figure 4:
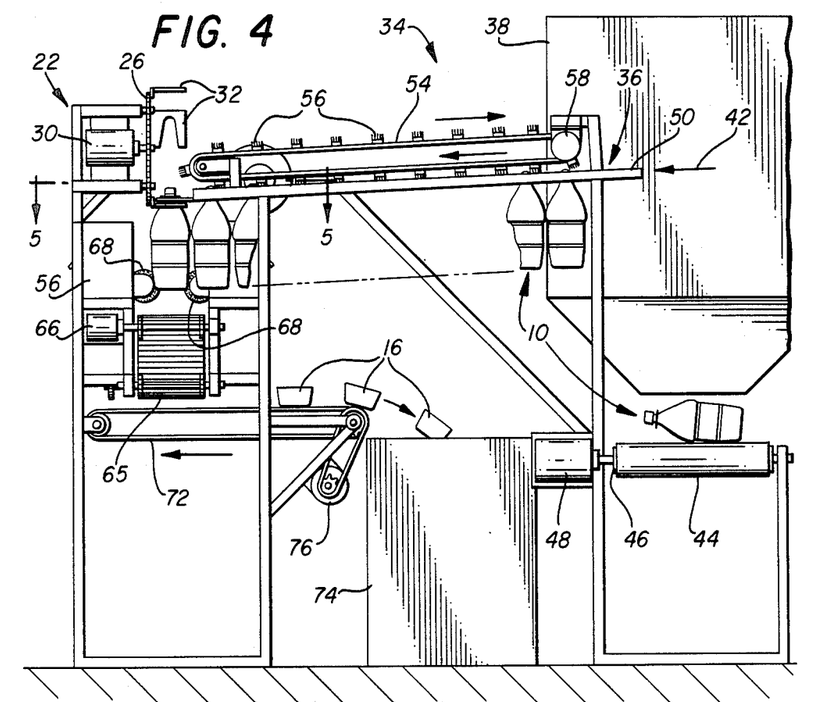
FIG. 4 is an enlarged view of the loading end of the apparatus.
Figure 5:
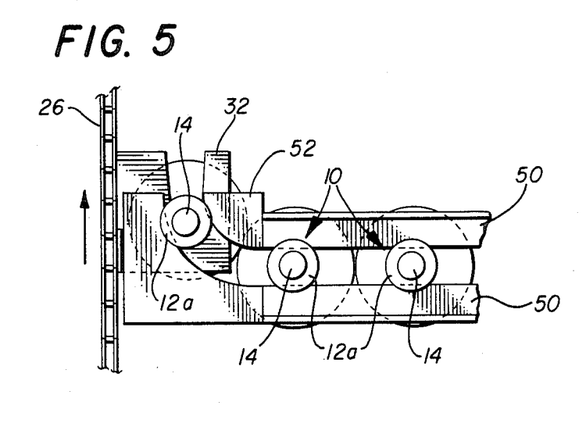
FIG. 5 is an enlarged sectional view of a loading transfer plate taken along lines 5—5 of FIG. 4 in the direction of the arrows.

Further details of loading station 34 are shown in FIGS. 4 and 5. Conveyor 40, which is of conventional construction, comprises an endless belt 44 mounted for rotation around a pair of rollers 46, one of which is driven by a drive motor 48. Each magazine 36 includes a pair of spaced apart rails 50 defining a slot for receiving the necks of bottles 12. For example, rails 50 can be constructed from straight sections of angle iron. Secured to the end of each pair of rails 50 is a transfer plate 52 having an arcuate slot therein for guiding containers into position for engagement with carriers 32. Immediately above each pair of rails 50 is a chain 54 on which is mounted a plurality of brushes 56. Chains 54 can be driven by a separate motor, or can be connected to main chain 26 by means of suitable gear boxes for actuation by motor 30. As illustrated, chains 54 of magazines 36 are driven in unison by a motor 58 coupled to a common shaft (FIG. 3) on which are secured the drive sprockets (not shown) for the chains.

Chains 54 are positioned so that the brushes 56 thereon gently engage the caps 14 of containers 10 and urge them toward transfer plates 52. The slots of transfer plates 52 are configured so that, when the leading containers 10 are positioned for engagement with carrier 32, the trailing containers are effectively blocked from further advancement. Brushes 56 thus engage containers 10 only to the extent necessary to advance the leading containers into but not through slotted transfer plates 52. Once positioned, the leading container 10 on each magazine 36 is then picked up by a carrier 32 and conveyed through apparatus 20.

When utilizing a plurality of magazines 36 simultaneously, the use of a timing means (not shown) is desirable to avoid interference between loaded carriers 32 and containers 10 waiting on transfer plates 52 ahead of the carriers.

Figure 6:
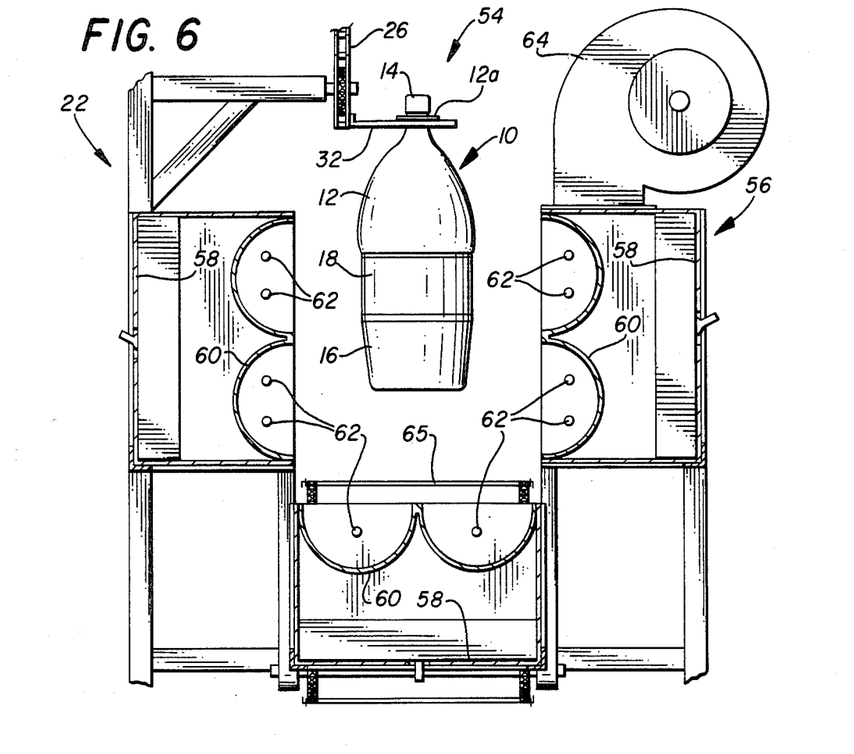
FIG. 6 is an enlarged partial section view taken along lines 6—6 of FIG. 3 showing a container being conveyed through an infrared heater unit.

Referring again to FIG. 2 and 3 in conjunction with FIG. 6, the container 10 are conveyed from loading station 34 through a first heating station 54 which includes a plurality of heater positioned along the path of chain 26 for softening the adhesive securing base cups 16 and labels 18 to bottles 12. In accordance with the preferred construction of apparatus 20, heating station 54 is compised of three infrared heaters 56 arranged in side by side relationship. For example, infrared heating units of the type available from Fostoria Industries, Inc. of Fostoria, Ohio are suitable for use as heaters 56.

Each heater 56, as is best seen in FIG. 6, includes three housings 58 with reflectors 60 and bulbs 62 mounted therein. The housings 58 are arranged in the form of a channel through which containers 10 are conveyed. Each heater 56 further includes a pair of blowers 64 connected by means to ducts to the housings 58 for cooling the interiors of the housings and the fixtures of bulbs 62. The temperature of heaters 56 can be adjusted in accordance with the speed of chain 26 to sufficiently heat the containers 10 to soften the adhesive securing base cups 16 and labels 18 to bottles 12. In actual practice, it has been found that a bottle temperature of about 200°-300° F. upon leaving heating station 54 is satisfactory.

Extending between containers 10 and the lowermost heating elements 62 is a wire conveyor 65 actuated by a drive motor 66. The purpose of wire conveyor 65 is to catch any base cups 16 that may prematurely disconnect from containers 10. Although preferred, the use of wire conveyor 65 is optional.

Having been heated in heating station 54, the containers 10 are then advanced between a first pair of rotating brushes 68 positioned to engage the base cups 16. Brushes 68 are mounted on a pair of interconnected shafts driven by motor 70. The innermost sides of brushes 68 are rotating downwardly. When containers 10 come into engagement with brushes 68, the base cups 16 are disconnected intact from bottles 12 and deposited onto an underlying conveyor 72 for conveyance into receptacle 74. Motor 76 is drivingly connected to conveyor 72. After each container 10 is heated in first heating station 54, each base cup 16 is thus removed and collected in a first receptacle.

Referring still to FIGS. 2 and 3, a second heating station 78 is provided after base cup-removing brushes 68. In accordance with the preferred construction, second heating station 78 is comprised of two infrared heaters 80 substantially similar to heaters 56 of first heating station 54. In second heating station 78, the heating of containers 10 is continued to further soften the adhesive securing labels 18 to bottles 12. An exiting bottle temperature of about 200°-300° F. has been found satisfactory. Station 78 preferably includes a wire conveyor 82 similar to wire conveyor 64 in station 54 for catching any labels 18 that may prematurely disconnect from containers 10. Wire conveyor 82 can be driven separately, or can be connected to conveyor 64 by chain 84 as shown for actuation therewith. It is will thus be appreciated that heating of containers 10 continues in second heating station 78 to further soften the adhesive securing labels 18 to bottles 12.

A second pair of rotating brushes 86 are provided after second heating station 78. Brushes 86 are substantially similar to brushes 68, but are positioned somewhat higher to engage labels 18 of containers 10. Brushes 86 are driven by a motor 88 which is connected to the shafts supporting the brushes. As each container 10 is advanced between brushes 86, its label 18 is disconnected substantially intact therefrom and deposited onto an underlying conveyor 90 for conveyance into a receptacle 92. Conveyor 90 is driven by a motor 94. It will thus be appreciated that the labels 18 from containers 10 are removed from bottles 12 and collected in a second receptacle.

Although apparatus 20 utilizes two heating stations each followed by a pair of rotating brushes to remove the base cups 16 and labels 18 from bottles 12, a single heating station with two pairs of rotating brushes could be utilized.

Figure 7:
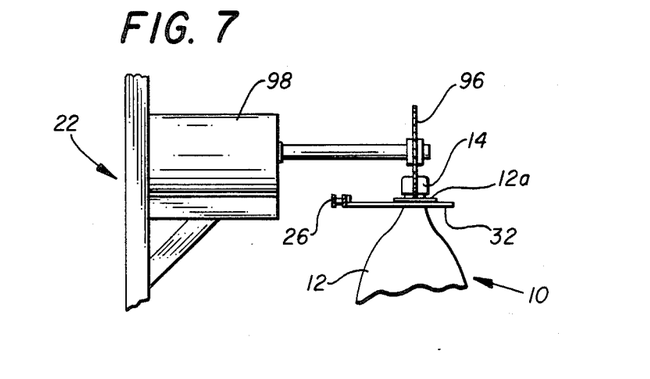
FIG. 7 is an enlarged partial section view taken along lines 7—7 of FIG. 3 showing a container being conveyed into position for removal of the cap.

Referring now to FIGS. 2 and 3 in conjunction with FIG. 7, the recycling apparatus 20 further includes a blade 96 located along the course of chain 26 for removing cups 14 from the bottles 12. Blade 96 is shown positioned beyond the second pair of rotating brushes 86, however, it can be located elsewhere along the course. Blade 96, which is driven by motor 98, is substantially similar to a circular saw rotating in a vertical plane. As each container 10 comes into engagement with blade 96, a vertical cut is made through bottle 12 above collar 12a thereby splitting cap 14 in half. The sections of caps 14 drop into an underlying receptacle 100. It will thus be appreciated that caps 14 of containers 10 are cut in half and collected in a third receptacle.

The course defined by sprockets 34 for chain 26 at the output end of recycling apparatus 20 includes a declined portion to release bottles 12 therefrom. Each bottle 12 slides out of its corresponding slotted carrier 32 under the action of gravity and falls into an underlying receptacle 102. Bottles 12 of containers 10 are thus collected substantially intact in a fourth receptacle.

In accordance with apparatus 20, containers 10 are therefore conveyed through a first heating station 54 to soften the hot melt adhesive securing the base cup 16 andl label 18 to the bottle 12 of each container. Heating softens the adhesive and causes bottles 12 to pucker and shrink somewhat. After the containers 10 have been sufficiently heated, the base cups 16 are detached intact by a first pair of rotating brushes 68 and deposited in a first receptacle 74. Heating of the containers 10 continues in second heating station 78, followed by removal of labels 18 by a second pair of rotating brushes 86 and deposition substantially intact into a second receptacle 92. The caps 14 are then split by a saw blade 96 and collected in a third receptacle 100. Bottles 12 are finally collected in a fourth receptacle 102. The contents of receptacles 74, 92, 100 and 102 can then be processed and recycled as desired.

Figure 8:
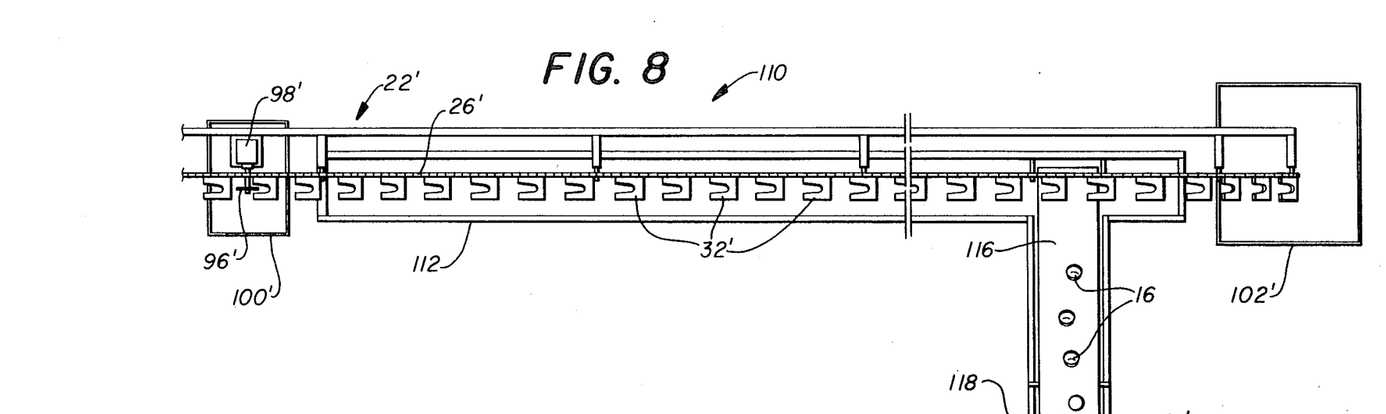
FIG. 8 is a top view of a recycling apparatus incorporating a second embodiment of the invention.
Figure 9:
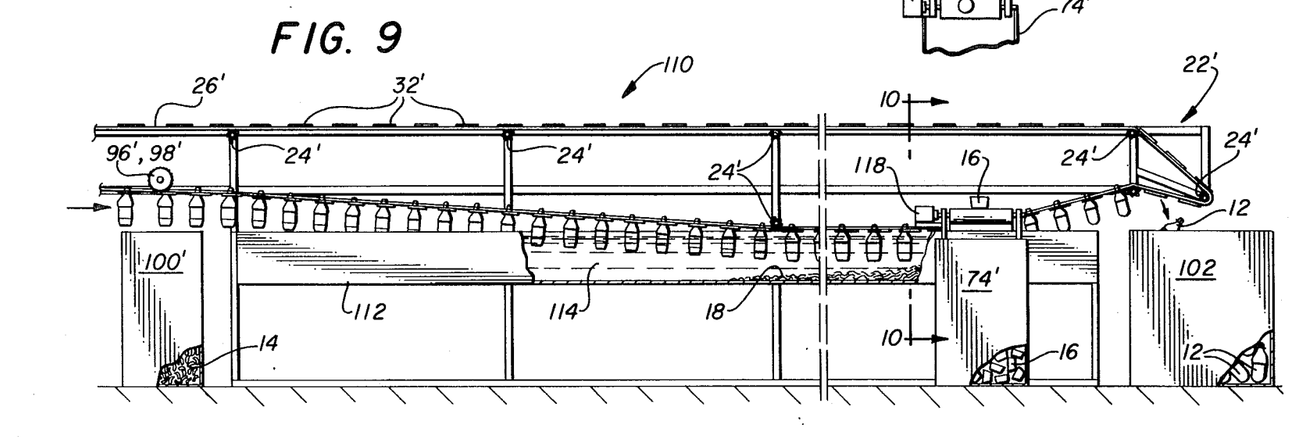
FIG. 9 is a side view of the apparatus in FIGURE 8.
Figure 10:
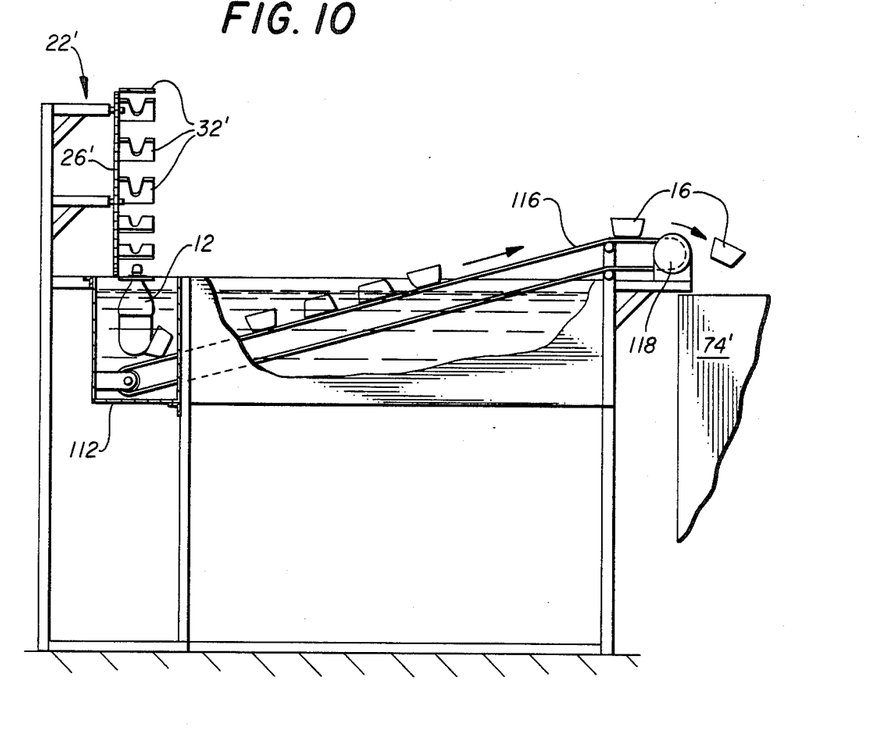
FIG. 10 is an enlarged section view taken along lines 10—10 of FIG. 9 in the direction of the arrows.

FIGS. 8-10 illustrate a recycling apparatus 110 incorporating a second embodiment of the invention. Recycling apparatus 110 utilizes several component parts which are substantially identical in construction and operation to corresponding parts in the first embodiment of the invention. Such corresponding parts have been identified with the same reference numerals, but have been differentiated thereafter by means of a prime (') designation.

A opposed to recycling apparatus 10 herein, which utilizes infrared heaters to heat containers 10 in a dry manner, the apparatus 110 of the second embodiment employs a tank 112 of hot liquid 114 for immersion of the containers. For example, tank 112 can be filled with water heated to a temperature of approximately 180° to 200° F., which is sufficient to soften the hot melt adhesive typically used to secure the base cups 16 and labels 18 to bottles 12. Containers 10 are substantially immersed in hot liquid 14 and are conveyed along tank 112 on chain 26'. Due to the combined effect of hot liquid 114 and the relative movement of containers 10 in the liquid, the labels 18 disconnect and settle to the bottom of tank 112. Upon approaching the end of tank 112, containers 10 engage a cross conveyor 116 which removes the base cups 16 from bottles 12 and deposits them in receptacle 74'. Conveyor 116 is of conventional construction and includes an endless belt mounted for rotation around a pair of rollers, one of which is driven by a motor 118. The caps 14 can be removed either before or after immersion of containers 10 in tank 112; however, for purposes of illustration, the caps are shown as being removed by saw blade 96' located ahead of the tank.

From the foregoing, it will be apparent that the present invention comprises a recycling system having several advantages over the prior art. The system herein is straightforward in construction, economical to install and operate, and is capable of high production rates. The discrete components of the containers are separately substantially intact for further processing and recycling. Other advantages will suggest themselves to those skilled in the art.

Although particular embodiments of the invention have been illustrated in the Drawing and described in the Detailed Description, it will be understood that the invention is not limited to the embodiments disclosed, but is intended to embrace any alternatives, modifications, equivalents, and/or substitutions of elements as fall within the scope of the invention as defined by the following claims.

We claim:

1. Apparatus for separating labels adhesively secured to plastic bottles, comprising:
   an endless belt mounted for rotation around a course;
   means for effecting rotation of said belt;
   a plurality of carriers secured to said belt for movement therewith, each of said carriers comprising a single piece flat plate with a notch therein oriented toward the travel direction of said belt, the notch being configured to engage the neck of a bottle;

means located along the course for heating said bottles to soften the adhesive securing the labels thereto;

means located along the course beyond said heating means for separating the labels from said bottles and collecting the labels; and a portion of the course followed by said belt being angled so that each bottle slides out of the notch of its corresponding carrier under gravity.

2. The apparatus of claim 1, wherein said heating means comprises at least one infrared heater positioned to heat the bottles transported on said belt.

3. The apparatus of claim 1, wherein said heating means comprises a tank of hot liquid extending beneath a portion of the course to heat by immersion the bottles transported on said belt.

4. The apparatus of claim 1, wherein said label-removing means comprises:

a pair of rotating brushes positioned to engage the label on opposite sides of each bottle;

a receptacle for receiving the removed labels; and a conveyor extending from a position beneath said brushes to said receptacle.

5. The apparatus of claim 1, wherein at least some of said bottles include base cups adhesively secured thereto, and further including:

means located along the course beyond said heating means for separating the base cups from said bottles and collecting the base cups.

6. The apparatus of claim 1, wherein at least some of said bottles include caps secured thereto, and further including:

means located along the course for separating the caps from said bottles and collecting the caps.

7. A system for removing labels and base cups adhesively secured to plastic bottles, comprising:

an endless belt of rotation around a course;

means for effecting rotation of said belt;

a plurality of carriers mounted serially on said belt for movement therewith, each of said carriers being adapted to receive a bottle;

means extending along a portion of the course for heating said bottles to soften the adhesive securing the labels and base cups thereto;

a first pair of rotating brushes adapted to engage the base cup on opposite sides of each bottle and remove said base cup;

a second pair of rotating brushes adapted to engage the label on opposite sides of each bottle and remove said labels; and means located along the course beyond said label and base cup-removing means for removing said bottle from said carriers and collecting said bottles.

8. The system of claim 7, wherein each carrier comprises a plate with a notch therein oriented toward the travel direction of said belt, the notch being configured to engage the neck of a bottle.

9. The system of claim 7, wherein said heating means comprises at least one infrared heater positioned to heat each bottle transported on said belt.

10. The system of claim 7, wherein said heating means comprises a tank of hot liquid extending beneath a portion of the course to heat by immersion each bottle transported on said belt.

11. The system of claim 7, wherein each carrier comprises a plate with a notch therein oriented toward the travel direction of said belt, the notch being configured to engage the neck of a bottle, and wherein said bottle-removing means comprises:

a portion of the course followed by said belt being angled so that each bottle slides out of the notch of its corresponding carrier under gravity; and a receptacle positioned beyond said angled portion of the course to receive said bottles after said bottles slide out of the notches of their corresponding carriers.

12. The system of claim 7, wherein at least some of said bottles include caps secured thereto, and further including:

means located along the course for removing the caps from said bottles and collecting the caps.

13. A system for separating labels and base cups adhesively secured to plastic bottles, which comprises:

an endless belt;

means for effecting rotation of said belt around a course;

a plurality of carriers secured to said belt for movement there with, each carrier including a single piece flat plate with a notch therein oriented toward the travel direction of said belt and configured to engage the neck of a bottle;

means extending along a portion of the course for heating said bottles to soften the adhesive securing the base cups and labels thereto;

a pair of rotating brushes adapted to engage the base cup on opposite sides of each bottle to remove said base cup;

a receptacle for receiving the base cups;

a conveyor extending from a position beneath said brushes to said receptacle;

a pair of rotating brushes adapted to engage the label on opposite sides of each bottle to remove said labels;

a receptacle positioned to receive the removed labels;

a conveyor extending from a position beneath said brushes to said receptacle;

a portion of the course followed by said belt being angled so that each bottle slides out of the notch of its corresponding carrier under gravity; and a receptacle positioned to receive said bottles after said bottles slide out of the notches of their corresponding carriers.

14. The system of claim 13, wherein said heating means comprises a plurality of infrared heaters positioned on opposite sides of the course to heat bottles carried by said transport means.

15. The system of claim 13, wherein at least some of said bottles include caps secured thereto, and further including:

means located along the course for separating the caps from said bottles and collecting the caps.

16. The system of claim 13, further including:

means positioned at the input end of the course for loading bottles into said transport means.

17. A system for removing the labels, base cups and caps from plastic bottles, said labels and base cups being adhesively secured to the bottles, comprising:

means including an endless belt for releasably transporting the bottles around a predetermined course having an input end and an output end;

means located along the course for heating the bottles to soften the adhesive securing the labels and base cups thereto;

means located along the course beyond the heating means for removing the base cups from said heated bottles;

means located along the course beyond said heating means for removing the labels from said heated bottles;

a rotating blade adapted to cut through the cap and upper end of each bottle to remove said cap; and means located at the output end of the course for removing said bottles from said transport means.

18. The system of claim 17, wherein said heating means comprises a plurality of infrared heaters positioned on opposite sides of the course to heat bottles carried by said transport means.

19. The system of claim 17, wherein said base cup-removing means comprises:
a pair of rotating brushes adapted to engage the base cup on opposite sides of each bottle.

20. The system of claim 17, wherein said label-removing means comprises:
a pair of rotating brushes adapted to engage the label on opposite sides of each bottle.

21. The system of Claim 17, further including:
means positioned at the input end of the course for loading bottles into said transport means.

22. A method of separating labels and base cups adhesively secured to plastic bottles, comprising the steps of:
(a) advancing the bottles along a predetermined course;
(b) heating the bottles to soften the adhesive securing the labels and base cups thereto;
(c) contacting the heated bottles with a pair of rotating brushes positioned to engage opposite sides of each bottle to remove the base cups therefrom;
(d) collecting the removed base cups;
(e) contacting the heated bottle with a pair of rotating brushes positioned to engage opposite sides of each bottle to remove the labels therefrom;
(f) collecting the removed labels; and
(g) collecting the bottles.

23. The method of claim 22, wherein step (a) is carried out by attaching the bottles in serial fashion to an endless belt mounted for movement around the predetermined course.

24. The method of claim 22, wherein step (b) is carried out by advancing the bottles between infrared heaters positioned on opposite sides of the predetermined course.

25. A method of removing the caps, labels and base cups from plastic bottles, the labels and base cups being adhesively secured to the bottles, comprising the steps of:
(a) attaching the bottles to a single piece flat plate with a notch therein which is connected to an endless belt constrained for movement around a predetermined course;
(b) heating the bottles to soften the adhesive securing the base cups and labels thereto;
(c) engaging the heated bottles to remove the base cups therefrom;
(d) collecting the removed base cups;
(e) engaging the heated bottles to remove the labels therefrom:
(f) collecting the removed labels;
(g) engaging the bottles with a rotating blade adapted to cut through the cap and upper end of each bottle to remove said caps;
(h) collecting the removed caps;
(i) detaching the bottles from the endless belt; and
(j) collecting the bottles.

26. The method of claim 25, wherein step (b) is carried out by pairs of infrared heaters located on opposite sides of the predetermined course.

27. The method of claim 25, wherein steps (c) and (e) are carried out by pairs of rotating brushes positioned to contact opposite sides of each bottle.

28. The apparatus of claim 1, wherein said separating means further comprises:
a receptacle positioned beyond said angled portion of the course to receive said bottles after said bottles slide out of the notches of their corresponding carriers.

29. A system for removing labels and base cups adhesively secured to plastic bottles, comprising:
an endless conveyor mounted for rotation around a course;
means for effecting rotation of said conveyor;
a plurality of carriers mounted serially on said conveyor for movement therewith, said carriers being adapted to receive the bottles in depending suspended upright relation;
means located along the course for removing the base cups from said bottles;
means extending along a portion of the course for heating said bottles to soften the adhesive securing the labels thereto;
brushing means for engaging the label of each heated bottle to remove said label; and
means located along the course beyond said label and base cup-removing means for removing said bottle from said carriers and collecting said bottles.

30. The system as recited in claim 29 wherein the brushing means which engage and remove the labels from the bottles comprise a pair of rotating brushes adapted to engage the label in a downward direction on opposite sides of each bottle to remove the label therefrom.

31. A system for removing labels adhesively secured to plastic bottles, comprising:
an endless conveyor mounted for rotation around a course;
means for effecting rotation of said conveyor;
a plurality of carriers mounted serially on said conveyor for movement therewith, said carriers being adapted to receive a bottle in depending suspended upright relation;
means extending along a portion of the course for heating said bottles to soften the adhesive securing the labels thereto;
brushing means for simultaneously engaging the label of each bottle on opposite sides of the bottle in a downward direction to remove said label; and
means located along the course beyond said label-removing means for removing said bottle from said carriers and collecting said bottles.

32. The system as recited in claim 31 wherein the brushing means which remove the labels from the bottles comprise a pair of rotating brushes adapted to engage the label on opposite sides of each bottle to remove the label therefrom.

33. A method of separating labels and base cups adhesively secured to plastic bottles, comprising the steps of:
(a) advancing the bottles along a predetermined course in suspended depending upright relation;

(b) contacting the bottles in a downward direction on opposite sides thereof to remove the base cups therefrom;

(c) collecting the removed base cups;

(d) heating the bottles to soften the adhesive securing the labels thereto;

(e) contacting the heated bottle with brushing means positioned to simultaneously engage each bottle from opposite sides thereof in a downward direction to remove the labels therefrom;

(f) collecting the removed labels; and (g) collecting the bottles.

34. The method as recited in claim 33 wherein the brushing means which contact and remove the labels from said bottles comprise a pair of rotating brushes positioned to engage opposite sides of each bottle to remove the labels therefrom.

35. A method of separating labels adhesively secured to plastic bottles, comprising the steps of:

(a) advancing the bottles along a predetermined course in depending suspended upright relation;

(b) heating the bottles to soften the adhesive securing the labels thereto;

(c) contacting the heated bottles with a pair of rotating brushes positioned to engage opposite sides of each bottle in a downward direction to remove the labels therefrom;

(d) collecting the removed labels; and (e) collecting the bottles.

36. A system for recycling plastic bottles of the type having a neck portion with an integral collar and a body portion having a label bonded to the exterior thereof, said system comprising a convery or unit having means for freely supporting a plastic bottle solely by the collar thereof in depending upright relation and moving said so supported bottle along a predetermined path between an entrance and an exit, heater means positioned along said path for heating a bottle moving along said path and softening the bond between the bottle and the label carried thereby, and brushing means positioned along said path downstream of said heater means and on opposite sides of said path for effecting a downward label removing action simultaneously on both sides of the bottle.

37. A system according to claim 36 together with a longitudinal endless conveyor extending generally parallel to said path ad below said path for receiving and conveying labels and the like prematurely discharged in advance of said brushing means.

38. A system according to claim 37 together with a transverse conveyor underlying said brushing means for receiving removed labels, said transverse conveyor underlying a downstream end of said longitudinal conveyor for receiving labels and the like carried by said longitudinal conveyor.

39. A system according to claim 36 for use in recycling plastic bottles having base cups, said system also including removing means disposed along said path in advance of said brushing means for moving a base cup downwardly relative to an associated bottle to detach the base cup.

40. A system according to claim 39 together with an endless conveyor extending transversely of said path from below said removing means for discharging removed base cups.

41. A method of preparing plastic bottles for salvage of the bottles wherein the plastic bottles are of the type having a neck portion with an integral collar and a body portion with a label bonded thereto, said method comprising the steps of suspending each bottle by its neck portion in an upright position utilizing the collar thereof, moving each bottle in sequence along a preselected path, heating each bottle during its movement along said path to soften the bond between the label and the bottle body, and then applying a downward brushing action on said body from opposite sides of the preselected path to remove the label.

42. A method according to claim 41 together with the step of collecting labels and other bottle components prematurely released from bottles as the bottles move along the path and discharging the collected labels and other bottle components together with removed labels.

43. A method according to claim 41 wherein the plastic bottles to be salvaged have base cups, and the method includes the steps of applying a downward base cup removing action on each base cup from each side of the path to downwardly remove the base cup in advance of label removal.

44. Apparatus for preparing platic bottles for salvage wherein the plastic bottles are of the type having a neck portion with an integral collar and a separate base cup, said apparatus comprising bottle engaging means for guiding and moving individual bottles along a predetermined path, said bottle engaging means including means for engaging the neck portion of each plastic bottle beyond the integral collar thereof to position each plastic bottle transversely of said path and axially thereof, and force applying means positioned along said path in spaced relation to said bottle engaging means in a direction axially of a moving plastic bottle for engaging the base cup of each passing plastic bottle to apply a base cup removing force to each base cup in a direction axially of the respective plastic bottle and away from said bottle engaging means while utilizing the integral collar of the respective plastic cup as anchoring means.

* * * * *